United States Patent
Mary et al.

(10) Patent No.: US 12,052,324 B2
(45) Date of Patent: Jul. 30, 2024

(54) METHOD AND SYSTEM FOR MANAGING A NOTIFICATION FOR MISSED EVENTS IN AN IOT ENVIRONMENT

(71) Applicant: Samsung Electronics Co., Ltd., Suwon-si (KR)

(72) Inventors: Shruti Mary, Noida (IN); Pankaj Tanwar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/187,317

(22) Filed: Mar. 21, 2023

(65) Prior Publication Data

US 2023/0224375 A1    Jul. 13, 2023

Related U.S. Application Data

(63) Continuation of application No. PCT/KR2022/021747, filed on Dec. 30, 2022.

(30) Foreign Application Priority Data

Dec. 30, 2021  (IN) .............................. 202111061908

(51) Int. Cl.
  H04L 67/55     (2022.01)
  G16Y 10/75     (2020.01)
  G16Y 40/10     (2020.01)

(52) U.S. Cl.
  CPC .............. *H04L 67/55* (2022.05); *G16Y 10/75* (2020.01); *G16Y 40/10* (2020.01)

(58) Field of Classification Search
  CPC .......... H04L 67/55; G16Y 40/10; G16Y 10/75
  See application file for complete search history.

(56) References Cited

U.S. PATENT DOCUMENTS

| 9,117,447 B2 | 8/2015 | Gruber et al. |
| 2011/0298614 A1 | 12/2011 | Bells |

(Continued)

FOREIGN PATENT DOCUMENTS

| JP | 2005-173885 A | 6/2005 |
| JP | 2021-092913 A | 6/2021 |

(Continued)

OTHER PUBLICATIONS

International Search Report and written opinion dated Apr. 24, 2023, issued in International Application No. PCT/KR2022/021747.

*Primary Examiner* — Suraj M Joshi
(74) *Attorney, Agent, or Firm* — Jefferson IP Law, LLP

(57) ABSTRACT

A method and a system for managing a notification for missed events in an Internet of things (IoT) environment are provided. The method includes determining at least one missed event in response to a user command to an IoT appliance after an expiry of a threshold wait time, determining a plurality of attributes associated with at least one of appliance settings and environment properties after the detection of at least one missed event based on a processing of the user command to obtain an attribute report corresponding to the plurality of attributes respective to each of the IoT appliance, predicting a requirement for notifying the user with respect to the determined at least one missed event based on the attribute report, and managing the notification corresponding to the at least one missed event based on the predicted requirement for notifying the user.

13 Claims, 11 Drawing Sheets

(56) References Cited

U.S. PATENT DOCUMENTS

| | | | |
|---|---|---|---|
| 2013/0252591 A1 | 9/2013 | Sasaki et al. | |
| 2014/0223311 A1 | 8/2014 | Auer et al. | |
| 2014/0372525 A1 | 12/2014 | Raghavan et al. | |
| 2016/0007290 A1 | 1/2016 | Lindemann et al. | |
| 2017/0013111 A1* | 1/2017 | Huang | H04M 1/72415 |
| 2017/0118348 A1 | 4/2017 | Dotan-Cohen et al. | |
| 2020/0076637 A1* | 3/2020 | Vishwari | H04L 12/282 |
| 2021/0176086 A1 | 6/2021 | Izu | |

FOREIGN PATENT DOCUMENTS

| | | |
|---|---|---|
| KR | 10-2019-0005360 A | 1/2019 |
| KR | 10-2019-0129232 A | 11/2019 |
| WO | 2019-212411 A1 | 11/2019 |

\* cited by examiner

METHOD AND SYSTEM FOR MANAGING A NOTIFICATION FOR MISSED EVENTS IN AN IOT ENVIRONMENT

CROSS-REFERENCE TO RELATED APPLICATION(S)

This application is a continuation application, claiming priority under § 365(c), of an International application No. PCT/KR2022/021747, filed on Dec. 30, 2022, which is based on and claims the benefit of an Indian patent application number 202111061908, filed on Dec. 30, 2021, in the Indian Intellectual Property Office, the disclosure of which is incorporated by reference herein in its entirety.

TECHNICAL FIELD

The disclosure relates to system and method for managing a notification for missed events in an Internet of things (IoT) environment.

BACKGROUND ART

Smart homes have become a widely accepted system. With the ease of voice assistants, users find it easy to make task executed on different smart appliances by being at any location. Many user commands require user to attend IoT appliances after command execution. However, several times the user can forget about it or be busy. Most IoT appliances keep on reminding users through signals or notifications after an instructed task has been executed, until the user attends it. In particular, the IoT appliances keep providing repetitive reminders until the user attends to the executed command. However, there is a possibility that the user may not need repetitive reminders for certain tasks. Hence, the user may get annoyed to get repetitive reminders.

None of the available IoT reminder systems identify if reminder of a missed IoT event is at all necessary. Sometimes, value of missed events does not degrade instantly and hence attendance can be skipped based on the nature and situation of the event. In such scenarios, if the user is busy or forgets about the event, then the user needs to be saved from annoyance of repetitive reminders of such events.

Some existing systems prioritize reminders based on user history choices or user's busy state and choose suitable time for reminding, but in both cases the system does not look into the nature of the reminder to check its importance at present time and save user from unnecessary reminders, if any.

Also, it is not necessary that all the missed events require quick action from the users and truly urgent missed events may be lost in the shuffle, if too many system functions are tied to providing notifications.

Hence, there is a need in the art to provide techniques which overcome the above discussed problems in the art.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and method for improving notifications to a user regarding missed events.

Additional aspects will be set forth in part in the description which follows and, in part, will be apparent from the description, or may be learned by practice of the presented embodiments.

Technical Solution

In accordance with an aspect of the disclosure, a method for managing a notification for missed events in an IoT environment is provided. The method includes determining, by a missed-event detection module, at least one missed event in response to a user command to an IoT appliance after an expiry of a threshold wait time. The method further comprises determining, by a missed-event importance module, a plurality of attributes associated with at least one of appliance settings and environment properties after the detection of at least one missed event based on a processing of the user command to obtain an attribute report corresponding to the plurality of attributes respective to each of the IoT appliance, Thereafter, the method comprises predicting, by a prediction module, a requirement for notifying the user with respect to the determined at least one missed event based on the attribute report. Then, the method comprises managing, by an event notifying manager module, the notification corresponding to the at least one missed event based on the predicted requirement for notifying the user.

In accordance with another aspect of the disclosure, a system for managing a notification for missed events in an IoT environment, is provided. The system includes a missed-event detection module configured to determine, at least one missed event in response to a user command to an IoT appliance after an expiry of a threshold wait time. The system further comprises a missed-event importance module configured to determine, a plurality of attributes associated with at least one of appliance settings and environment properties after the detection of at least one missed event based on a processing of the user command to obtain an attribute report corresponding to the plurality of attributes respective to each of the IoT appliance. The system also comprises a prediction module configured to predict a requirement for notifying the user with respect to the determined at least one missed event based on the attribute report. The system further comprises an event notifying manager module configured to manage, the notification corresponding to the at least one missed event based on the predicted requirement for notifying the user.

Hence, the disclosed techniques intelligently decide to give a reminder or not of the missed IoT event to the user. It uses the nature and importance of the missed event at that instant of time to understand if it is necessary for the user to know about it. This saves the unnecessary annoying flow of multiple reminders to the user.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

Figure 1:
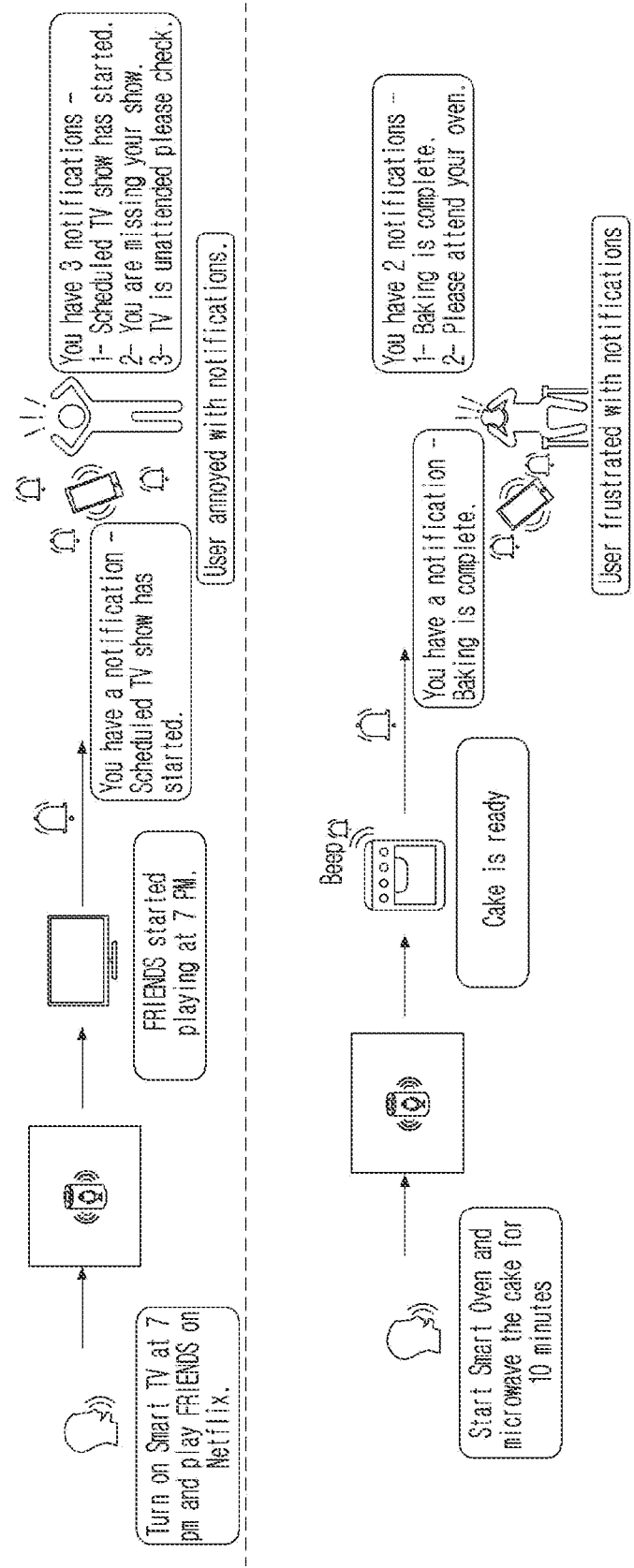
FIG. 1 illustrates examples of notifications provided by IoT devices, according to the related art.

Further, skilled artisans will appreciate that elements in the drawings are illustrated for simplicity and may not have been necessarily drawn to scale. For example, the flow charts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

BEST MODE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Embodiments of the disclosure will be described below in detail with reference to the accompanying drawings.

FIG. 1 illustrates few examples of such scenarios according to the related art.

Referring to FIG. 1, in one example, the user has instructed its smart television (TV) to turn on at 7 pm and play TV show "FRIENDS" on Netflix. Accordingly, at 7 pm, the smart TV is turned on and start playing TV show "FRIENDS" on Netflix. Also, the smart TV starts providing notifications to the user about the start of TV show. However, the user may have guests to attend and may get irritated with the notifications. In another example, the user may have instructed an Oven to start and microwave a cake for 10 minutes. After 10 minutes, the oven may start providing notifications to the user about the completion of cake. However, the user may want the cake to cool down for a bit and may be annoyed with repetitive notifications from its oven. Hence, the available systems do not identify the importance of missed events to a user and accordingly, decide whether to provide notifications to the user.

Figure 2:
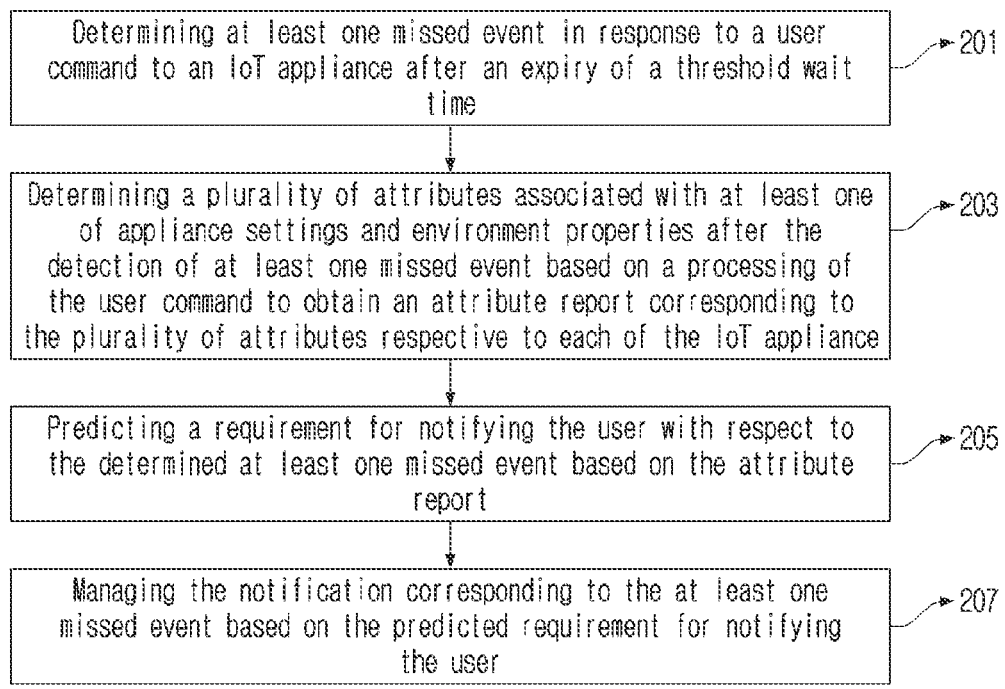
FIG. 2 illustrates a flow diagram depicting a method for managing a notification for missed events in an IoT environment, according to an embodiment of the disclosure.

FIG. 2 illustrates method-operations according to an embodiment of the disclosure. In an implementation as depicted in FIG. 2, the subject matter refers to a method for managing a notification for missed events in an IoT environment.

Referring to FIG. 2, a method 200 comprises determining, at operation 201, at least one missed event in response to a user command to an IoT appliance after an expiry of a threshold wait time. In other words, the appliance waits for a threshold wait time expecting the user to attend the appliance, after which it decides if user has missed the event. If the user attends the appliance till the threshold wait time, the method 200 terminates. However, if the user does not attend the appliance till the threshold wait time, it is detected as a missed event case.

In particular, the method 200 comprises receiving the user command for instructing the IoT appliance to execute the instruction, such as instructing an oven to bake cake for 10 minutes. Then, the instruction is executed to obtain at least one event as a result of the execution based on the received user command. In an example, the event being baking of the cake. Then, the appliance waits for the user to attend the at least one event for the threshold wait time. If the user does not attend to the at least one event within the threshold wait time, then it is determined that the event is missed. In other words, the at least one missed event is determined after the expiry of the threshold wait time.

Further, in an embodiment, the threshold wait time may be determined based on the processing of the user command. Also, the threshold wait time is specific to a type of IoT appliance and a type of task executed by the IoT appliance. Hence, the threshold wait time may be specific to the appliance and task done. In other words, the threshold wait time is configurable and specific to the appliance and the task.

In a further embodiment, to determine the threshold wait time, the user command may be converted in an expression format after the execution of the instruction. Below are few examples to convert the user command into expression format:

User command: Switch ON Smart TV and play cricket on Star Sports;
Execution of command: smart TV started playing cricket on Star Sports;
Expression: cricket match is playing;
User command: Start Smart Oven and re-heat rice;
Execution of command: smart oven cooked rice;
Expression: cooked rice at 120 degree Celsius;
User command: Bring Smart Self-driving Car to;
Execution of command: self-driving car parked at main entry gate;
Expression: Model X car engine is idling;
User command: Open Smart Door of study room;
Execution of command: smart door of the study room opened;
Expression: study room door is opened;

Thereafter, subject parameters may be extracted from the expression format. The subject parameters may comprise a resultant output of the execution of the user command Thereafter, a context of a delay for the user to attend the at least one event based on the extracted subject parameters, may be determined. The context of delay may be determined using a database which may comprise the factors due to which users mostly delay in using or consuming the results of IoT tasks. Below are few examples of subject parameters and Context of delay factor—

Smart TV:
Expression: cricket match is playing
Subject parameter extracted from expression—cricket match
Context of delay factor—Introduction
Smart Oven:
Expression: cooked rice at 120 degree Celsius
Subject parameter extracted from expression—Rice
Context of delay factor—Edible Temperature
Self-driving Car:
Expression: Model X car engine is idling
Subject parameter extracted from expression—Car
Context of delay factor—Warm up
Smart Door:
Expression: study room door is opened
Subject parameter extracted from expression—Door,
Context of delay factor—None Thereafter, a time period for which the user's absence to attend the at least one event is acceptable, may be obtained. The obtained time period may correspond to the threshold wait time that is specific to the IoT appliance, and the type of task executed by the IoT appliance. In an embodiment, the time period may be obtained by querying to a search engine about a time required by the extracted subject parameter for completion of the context of the delay. The search engine may provide a response about the queried required time, wherein the received response includes information about the time period. In case of cricket match, based on the subject parameters, the method 200 may provide a query to the search engine i.e., what is time taken by introduction and may get a result as 120 second. Hence, the threshold wait time would be 120 seconds. Similarly, in case of cake baking, based on the subject parameters, the method 200 may provide a query to the search engine i.e., "What is the time taken to reduce get edible rice temperature from 120 degree Celsius?" and may receive a result as 60 seconds. Hence, the threshold wait time would be 160 seconds. In another case of parking of self-driving car, based on the subject parameters, the method 200 may provide a query to the search engine i.e. "What is the time taken by model X car engine for warm up" and may receive a result as 10 seconds. Hence, the threshold wait time would be 10 seconds. In another case of study room, as there is no subject, hence, there is no delay context. Therefore, the threshold wait time would be 0 seconds.

After determining the missed event, at operation 203, the method 200 comprises determining a plurality of attributes associated with at least one of appliance settings and environment properties after the detection of at least one missed event. The plurality of attributes may be determined based on a processing of the user command to obtain an attribute report corresponding to the plurality of attributes respective to each of the IoT appliance. The attribute report may describe nature and situation of the event which can determine the importance of attending it.

In an embodiment, the attribute report may be obtained by extracting subject parameters and object parameters from the user command Below are few examples of extracting subject parameters and object parameters form a user command:

User Command—Switch ON Smart TV and play FRIENDS on Netflix at 7 pm
Subject—TV, Objects—FRIENDS, NETFLIX
User Command—Start Smart Oven and re-heat rice for 2 minutes.
Subject—Oven, Objects—rice
User Command—Open Smart Door of main gate after 5 min.
Subject—Door, Objects—main gate
User Command—Bring Smart Self-driving Car to backyard after 10 min
Subject—Car, Objects—backyard Thereafter, the plurality of attributes associated with the at least one of the IoT appliance settings and the environment properties are obtained based on a query to the IoT appliance. In particular, each smart appliance has implemented an Appliance Understanding Interface which queries details about the task executed by the appliance. The appliances return exclusive sets of attribute values describing the status of the appliance through its current settings, and of its inner-outer environment through the distinct properties of different components in the environment. The attributes lead to understanding the nature of the task executed and how the task output importance may change over time. Thus, these attributes become decisive features to determine user's attention necessity towards task output.

For every query, the interface generates dictionary report of attribute values. Hence, the attribute report may be obtained based on the obtained plurality of attributes and the extracted subject parameters and object parameters. Below are few examples of attribute report for different appliances:

Smart TV: The importance of attending a content on TV at an instant majorly depends on the fact that it is a one-time show, or can be re-watched later with ease, like if recorded or app casted.
Appliance Settings:
Recording
Environment Properties:
(Inner environment—TV content)
Content Recorded and Replaying
Live Content
Content from Broadcasting Channel
Content from Streaming App
Attribute Report:

| ATTRIBUTE | VALUE |
| --- | --- |
| Live | Yes/No |
| Recorded | Yes/No |
| Recording | ON/OFF |
| From Broadcasting Channel | Yes/No |
| From Streaming App | Yes/No |

Smart Oven: The importance of attending a cooked item in Oven majorly depends on the fact that it can be served later with ease without hampering food quality and oven cabinet or not.
Appliance Settings:
Type of Oven,
Mode of cooking
Environment Properties:
(Inner environment—food to be cooked)
Food dish
Attribute Report:

| ATTRIBUTE | VALUE |
| --- | --- |
| Type | All possible: Convection/OTG, etc. |
| Cooking Mode | All possible: Re-heat, Sun dry, Microwave, etc. |
| Cooking Food | All possible: Food dish like cake, rice, etc. |

Self-Driving Car: The importance of attending a parked Car at an instant majorly depends on the fact that it is not creating chaotic traffic for others nor has any security threat.
Appliance Settings:
Traffic sensing Camera
Environment Properties:
(Outer environment—location details of car)
Car Location
Destination Location
Attribute Report:

| ATTRIBUTE | VALUE |
| --- | --- |
| Nearby Incoming Vehicle | Yes/No |
| Car Location | Home Campus/Outdoors |
| Destination Location | Home Campus/Outdoors |

Smart Door: The importance of attending an opened Door at an instant majorly depends on the fact that the opening does not invite any uninvited peep or security threat.
Appliance Settings:
Intrusion sensing Camera
Environment Properties:
(Outer environment—location of door)
Door location in home campus
Attribute Report:

| ATTRIBUTE | VALUE |
| --- | --- |
| Location | Inner/Peripheral |
| Person Crossed Door | Yes/No |

After obtaining the attribute report, the method 200 comprises, at operation 205, predicting a requirement for notifying the user with respect to the determined at least one missed event based on the attribute report. In an embodiment, the attribute report is feed to a neural network as a dataset corresponding to the plurality of attributes respective to each of the IoT appliances to predict the requirement for notifying the user with respect to the determined at least one missed event. In an example, datasets are created for each smart appliance by surveying user if their attention is required to attend missed IoT event in different scenarios. The different scenarios arise from different combination of values of the obtained attributes. The dataset input features are these attributes, and the target variable is user attention necessity (yes or no). Feed forward neural networks are trained on these datasets which predicts user attention necessity. During testing, the interface provides the feature values.

Below are few examples of datasets related to different smart appliances:

Smart TV Dataset Headers:

| Live | Recorded | Recording | From Broadcasting Channel | From Streaming App | Predicted User Attention Necessity |
| --- | --- | --- | --- | --- | --- |
| Yes/No | Yes/No | ON/OFF | Yes/No | Yes/No | Yes/No |

Smart Oven Dataset Headers:

| Type | Cooking Mode | Cooking Food | Predicted User Attention Necessity |
| --- | --- | --- | --- |
| Convection/OTG, etc. | Re-heat/Microwave, etc. | Food item - rice, cake, masala, etc. | Yes/No |

Smart Car Dataset Headers:

| Car Location (Home Campus/Outdoors) | Nearby vehicle identified | Destination location(Home Campus/Outdoors) | Predicted User Attention Necessity |
| --- | --- | --- | --- |
| Home Campus/Outdoors | Yes/No | Home Campus/Outdoors | Yes/No |

Smart Door Dataset Headers:

| Door Location | Person Crossed Door | Predicted User Attention Necessity |
|---|---|---|
| Inner/Peripheral | Yes/No | Yes/No |

Thereafter, the method 200 comprises, at operation 207, managing the notification corresponding to the at least one missed event based on the predicted requirement for notifying the user. For example, if the user attention necessity towards attending the missed IoT event is predicted to be yes, the reminder is sent to the user. The user then attends the appliance. This case signifies that the value/quality of the IoT output would have been deteriorated or diminished or endangered at a later time, so user needs to attend it at the present moment itself. However, if the user attention necessity towards attending the missed IoT event is predicted to be No, the user is not reminded. The user can continue with his current state, either free or busy, without any disturbance. The appliance is switched off or closed stopping wastage of resources. This case signifies that the value/quality of the IoT output remains intact at a later time, so user need hurry to not attend it at the present moment itself.

In a further embodiment, in case of a IoT hub, where a plurality of IoT devices are connected to a cloud server, if there is an incompetent IoT device connected to the server for data processing and the IoT device is idle, then, after predicting that the user's attention is not needed towards a missed IoT events, a IoT device such as smart appliance A is in idle condition. Then, capability is checked for required processing planned on server. If it is found that the idle IoT device i.e., smart appliance A is capable of required processing then the sensor data processing is re-directed to Smart Appliance A. This way, the IoT system may be de-centralized, bringing all possible processing from cloud servers to the edge devices.

Figure 3:
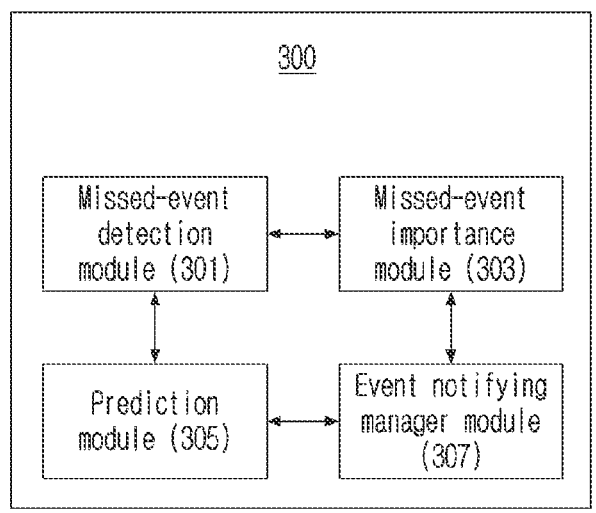
FIG. 3 illustrates a block diagram of a system for managing a notification for missed events in an IoT environment, according to an embodiment of the disclosure.

FIG. 3 illustrates a block diagram of a system for managing a notification for missed events in an IoT environment, according to an embodiment of the disclosure.

Referring to FIG. 3, a system 300 may comprise a missed-event detection module 301 configured to determine, at least one missed event in response to a user command to an IoT appliance after an expiry of a threshold wait time. The system 300 may further comprise a missed-event importance module 303 configured to determine a plurality of attributes associated with at least one of appliance settings and environment properties after the detection of at least one missed event based on a processing of the user command to obtain an attribute report corresponding to the plurality of attributes respective to each of the IoT appliance. The system 300 may further comprise a prediction module 305 configured to predict a requirement for notifying the user with respect to the determined at least one missed event based on the attribute report. The system 300 may also comprise an event notifying manager module 307 configured to manage, the notification corresponding to the at least one missed event based on the predicted requirement for notifying the user. In an embodiment, the system 300 may be configured to perform the method as discussed in respect to FIG. 2.

In an embodiment, the various modules 301-307 may be a single processing unit or a number of units, all of which could include multiple computing units. Modules 301-307 may be implemented as one or more microprocessors, microcomputers, microcontrollers, digital signal processors, central processing units, state machines, logic circuitries, and/or any devices that manipulate signals based on operational instructions. Among other capabilities, the modules 301-307 may be configured to fetch and execute computer-readable instructions and data stored in a memory. The modules 301-307 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory. The predefined operating rule or artificial intelligence model is provided through training or learning.

FIGS. 4A, 4B, 5A, 5B, 6A, 6B, 7A, and 7B illustrate various uses cases based on the present mechanism, according to various embodiments of the disclosure.

Figure 4A:
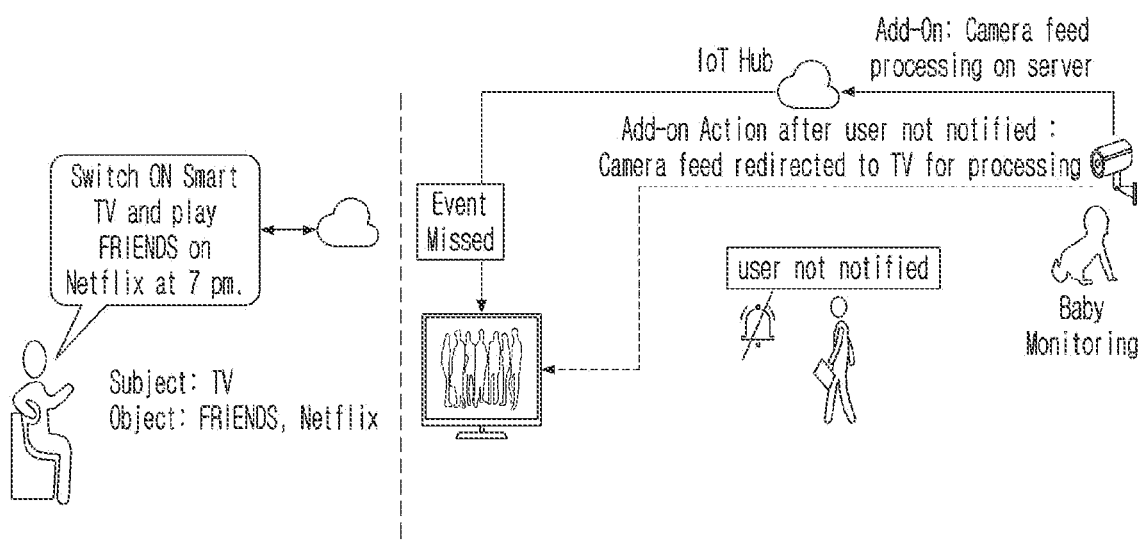
FIGS. 4A, 4B, 5A, 5B, 6A, 6B, 7A, and 7B illustrate various use cases based on the present mechanism, according to various embodiments of the disclosure.
Figure 4B:
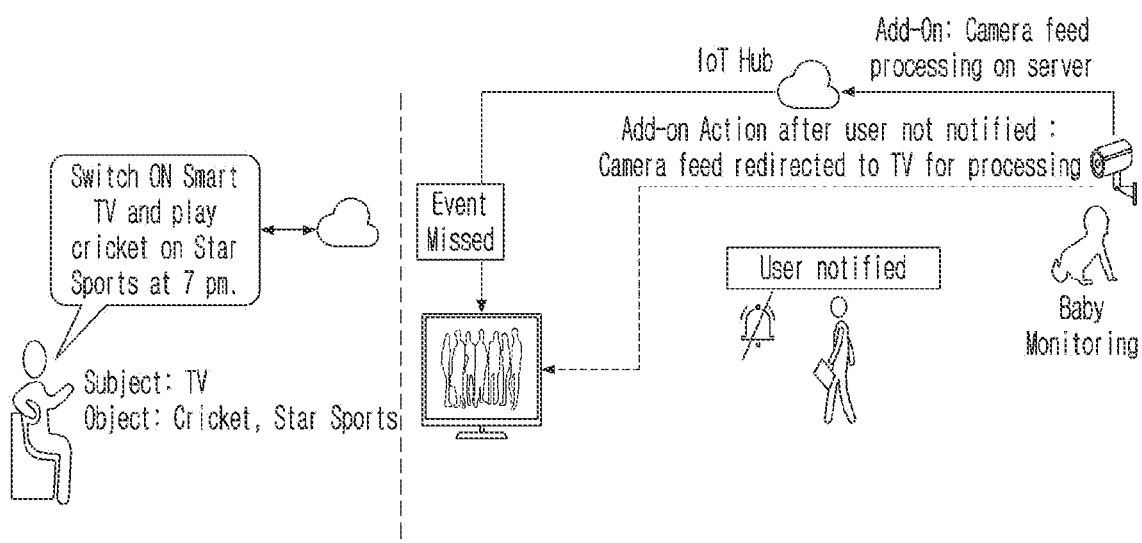

Referring to FIG. 4A, a user gave a command to smart TV to open at 7 pm and stream FRIENDS on NETFLIX. The command is directed to the smart TV. At 7 pm, the smart TV started streaming FRIENDS. As discussed above, a threshold wait time is determined to detect a missed event. For example, the threshold wait time is determined as 120 seconds. After 120 seconds, the user did not attend TV and a missed event is detected. Based on the user command, subject and object parameters are extracted as TV and FRIENDS, Netflix respectively. Also, a plurality of attributes (as shown below) are obtained.

| Live | Recorded | Recording | From Broadcasting Channel | From Streaming App | Predicted User Attention Necessity |
|---|---|---|---|---|---|
| No | No | OFF | No | Yes | No |

Based on the plurality of attributes, it is predicted if the user attention is necessary. In this example, it is predicted that the user attention is not necessary. Hence, no reminder is sent to user. Similarly, referring to FIG. 4B, the below plurality of attributes may be considered in determining that user shall not be notified:

| Live | Recorded | Recording | From Broadcasting Channel | From Streaming App | Predicted User Attention Necessity |
|---|---|---|---|---|---|
| Yes | No | OFF | Yes | No | Yes |

Figure 5A:
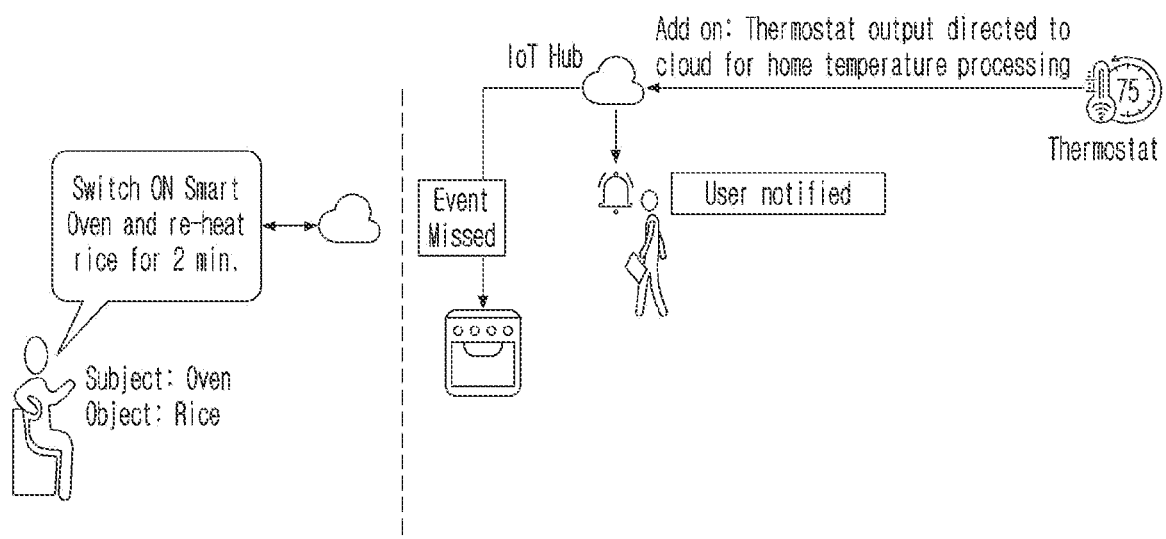

Referring to FIG. 5A, the below plurality of attributes may be considered in determining that user shall be notified:

| Oven Type | Cooking Mode | Object Item | Predicted User Attention Necessity |
|---|---|---|---|
| Convection | Re-heat | Rice | Yes |

Figure 5B:
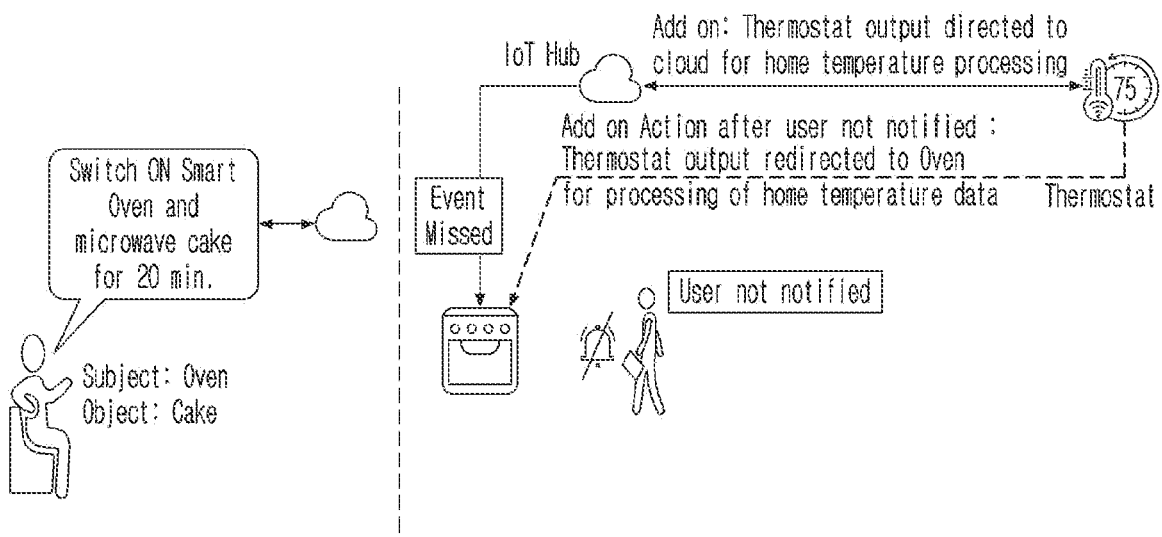

Referring to FIG. 5B, the below plurality of attributes may be considered in determining that user shall not be notified:

| Oven Type | Cooking Mode | Object Item | Predicted User Attention Necessity |
|---|---|---|---|
| Convection | Microwave | Cake | No |

Figure 6A:
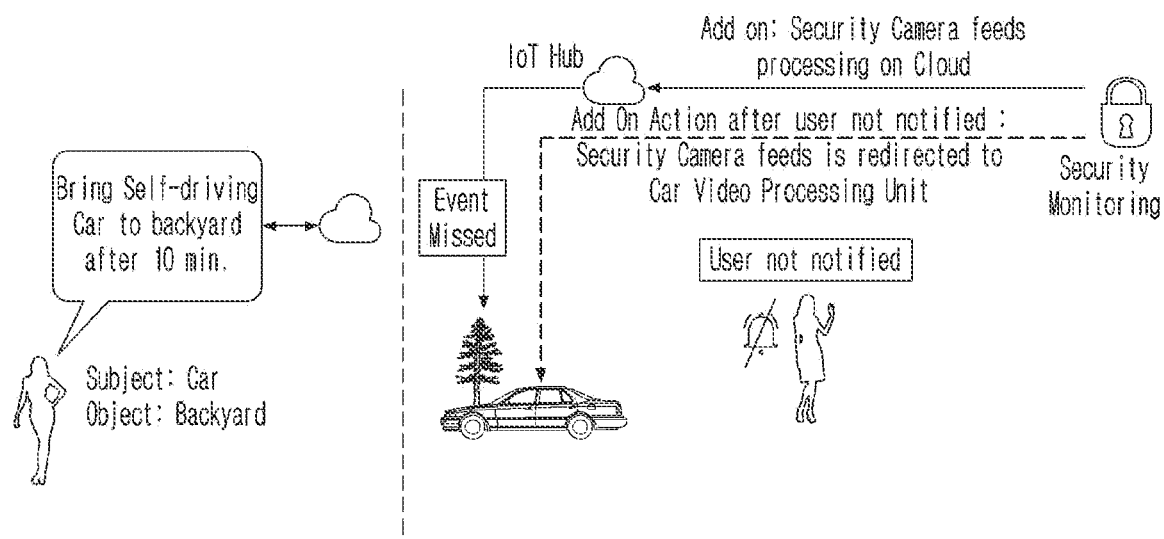

Referring to FIG. 6A, the below plurality of attributes may be considered in determining that user shall not be notified:

| Car Location (Home Campus/ Outdoors) | Nearby vehicle identified | Destination location (Home Campus/Outdoors) | Predicted User Attention Necessity |
|---|---|---|---|
| Home | No | Home | No |

Figure 6B:
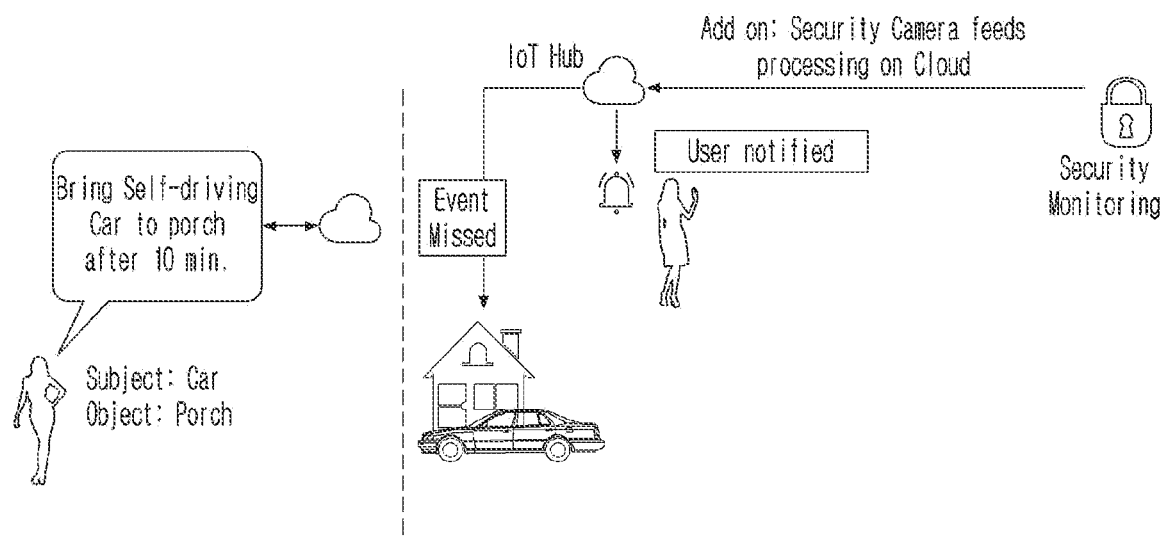

Referring to FIG. 6B, the below plurality of attributes may be considered in determining that user shall be notified:

| Car Location (Home Campus/ Outdoors) | Nearby vehicle identified | Destination location (Home Campus/Outdoors) | Predicted User Attention Necessity |
|---|---|---|---|
| Home | Yes | Outdoor | Yes |

Figure 7A:
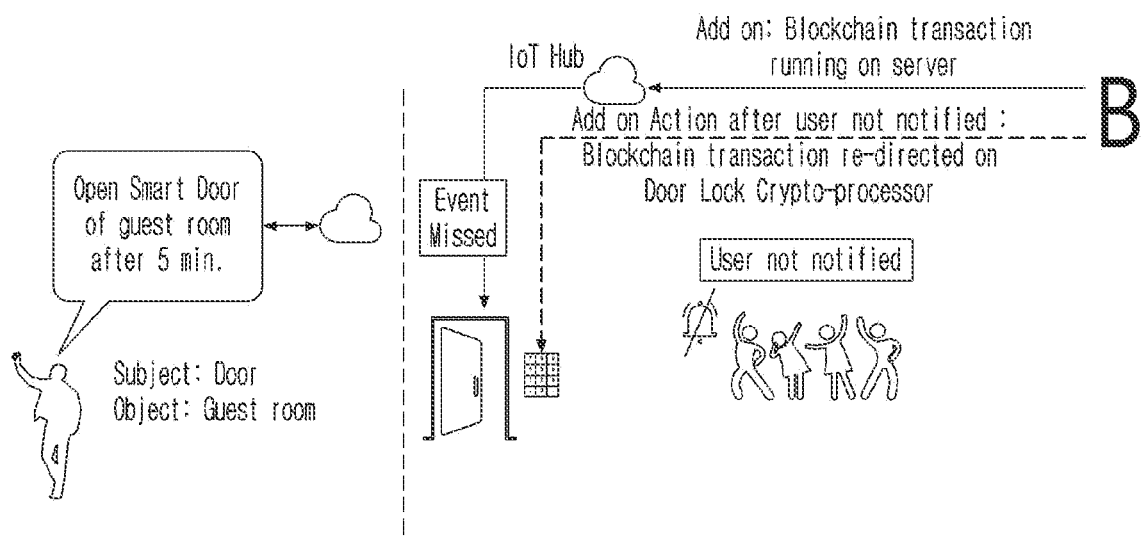

Referring to FIG. 7A, the below plurality of attributes may be considered in determining that user shall not be notified:

| Door Location (Inner/Peripheral) | Person Crossed Door | Predicted User Attention Necessity |
|---|---|---|
| Inner | No | No |

Figure 7B:
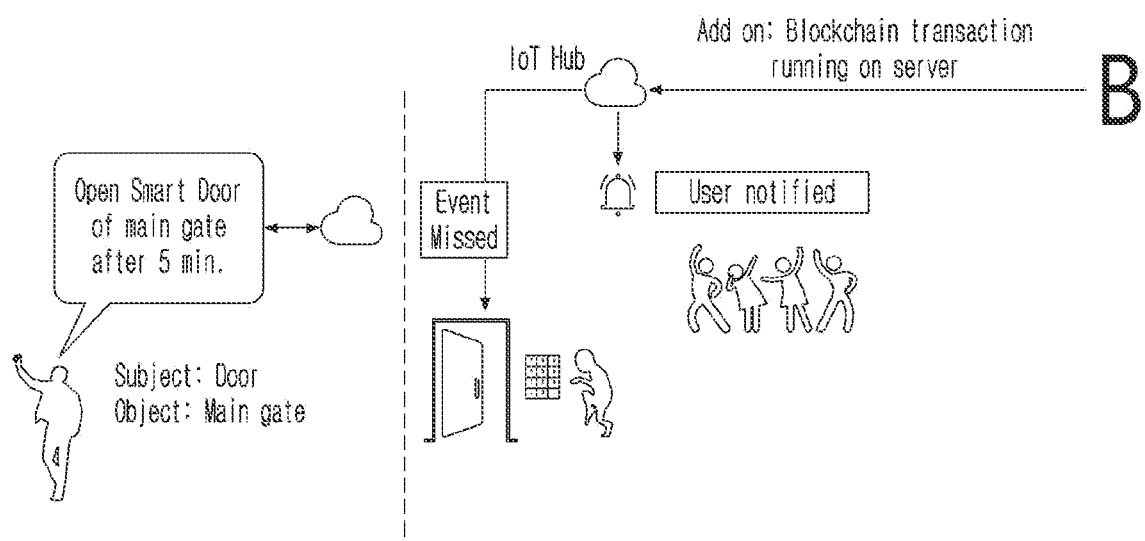

Referring to FIG. 7B, the below plurality of attributes may be considered in determining that user shall be notified:

| Door Location (Inner/Peripheral) | Person Crossed Door | Predicted User Attention Necessity |
|---|---|---|
| Peripheral | Yes | Yes |

As discussed above in respect of FIGS. 4A, 4B, 5A, 5B, 6A, 6B, 7A, and 7B, necessity of user attention may be predicted based on plurality of attributes and accordingly reminder may be provided to user. Hence, the disclosed techniques intelligently decide to give a reminder or not of the missed IoT event to the user.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing a notification for missed events in an Internet of things (IOT) environment, the method comprising:
   in response to an expiry of a threshold wait time after a user command is received by an IoT appliance, determining, by a missed-event detector, at least one missed event;
   after determining the at least one missed event, determining, by a missed-event importance determiner, a plurality of attributes associated with at least one of appliance settings or environment properties based on a processing of the user command to obtain an attribute report corresponding to the plurality of attributes respective to each IoT appliance;
   based on the attribute report, predicting, by a predictor, a requirement for notifying a user with respect to the determined at least one missed event; and
   based on the requirement for notifying the user, managing, by an event notifying manager, a notification corresponding to the at least one missed event,
   wherein the processing of the user command for obtaining the attribute report comprises:
   extracting subject parameters and object parameters from the user command;
   obtaining the plurality of attributes associated with the at least one of the IoT appliance settings or the environment properties based on a query to the IoT appliance; and
   based on the plurality of attributes and the extracted subject parameters and object parameters, obtaining the attribute report.

2. The method of claim 1, further comprising:
   receiving, by the missed-event detector, the user command for instructing the IoT appliance to execute an instruction;
   based on the user command, executing, by the missed-event detector, the instruction to obtain at least one event as a result of the execution; and
   waiting, by the missed-event detector, for the user to attend the at least one event for the threshold wait time, wherein the at least one missed event is determined after the expiry of the threshold wait time.

3. The method of claim 2, further comprising:
  determining the threshold wait time based on the processing of the user command,
  wherein the threshold wait time is determined specific to a type of IoT appliance and a type of task executed by the IoT appliance.

4. The method of claim 3, wherein the processing of the user command for determining the threshold wait time comprises:
  converting the user command after executing the instruction in an expression format, wherein the expression format describes a status of the executed instruction in response to the user command;
  extracting subject parameters from the expression format, wherein the subject parameters comprise a resultant output of the executing of the user command;
  based on the extracted subject parameters, determining a context of a delay for the user to attend the at least one event; and
  obtaining a time period for which a user's absence to attend the at least one event is acceptable,
  wherein the time period corresponds to the threshold wait time, specific to the IoT appliance, and the type of task executed by the IoT appliance.

5. The method of claim 4,
  wherein the obtaining of the time period comprises:
    querying a search engine about a time required by the extracted subject parameters for completion of the context of the delay; and
    receiving a response about the time required, and
  wherein the received response includes information about the time period.

6. The method of claim 1, wherein the extracted subject parameters and object parameters comprise a type of IoT appliance and a type of task executed by the IoT appliance, respectively.

7. The method of claim 1, further comprising:
  feeding the attribute report to a neural network as a dataset corresponding to the plurality of attributes respective to each IoT appliance to predict the requirement for notifying the user with respect to the determined at least one missed event.

8. A system for managing a notification for missed events in an Internet of things (IOT) environment, the system comprising:
  at least one first processor of a missed-event detector being configured to, in response to an expiry of a threshold wait time after a user command is received by an IoT appliance, determine at least one missed event;
  after determining the at least one missed event, at least one second processor of a missed-event importance determiner being configured to determine a plurality of attributes associated with at least one of appliance settings or environment properties based on a processing of the user command to obtain an attribute report corresponding to the plurality of attributes respective to each IoT appliance;
  based on the attribute report, at least one third processor of a predictor being configured to predict a requirement for notifying a user with respect to the determined at least one missed event; and
  based on the requirement for notifying the user, at least one fourth processor of an event notifying manager being configured to manage a notification corresponding to the at least one missed event,
  wherein the processing of the user command for obtaining the attribute report comprises:
    extracting subject parameters and object parameters from the user command;
    obtaining the plurality of attributes associated with the at least one of the IoT appliance settings or the environment properties based on a query to the IoT appliance; and
    based on the plurality of attributes and the extracted subject parameters and object parameters, obtaining the attribute report.

9. The system of claim 8,
  wherein the at least one first processor of the missed-event detector is further configured to:
    receive the user command for instructing the IoT appliance to execute an instruction;
    execute the instruction to obtain at least one event as a result of the execution; and
    wait for the user to attend the at least one event for the threshold wait time, and
  wherein the at least one missed event is determined after the expiry of the threshold wait time.

10. The system of claim 9,
  wherein the at least one first processor of the missed-event detector is further configured to:
    determine the threshold wait time based on the processing of the user command, and
  wherein the threshold wait time is determined specific to a type of IoT appliance and a type of task executed by the IoT appliance.

11. The system of claim 10,
  wherein, for the processing of the user command for determining the threshold wait time, the at least one first processor of the missed-event detector is further configured to:
    convert the user command after executing the instruction in an expression format, wherein the expression format describes a status of the executed instruction in response to the user command;
    extract subject parameters from the expression format, wherein the subject parameters comprise a resultant output of the executing of the user command;
    based on the extracted subject parameters, determine a context of a delay for the user to attend the at least one event; and
    obtain a time period for which a user's absence to attend the at least one event is acceptable, and
  wherein the time period corresponds to the threshold wait time, specific to the IoT appliance, and the type of task executed by the IoT appliance.

12. The system of claim 11,
  wherein, for the obtaining of the time period, the at least one first processor of the missed-event detector is further configured to:
    query a search engine about a time required by the extracted subject parameters for completion of the context of the delay; and
    receive a response about the time required, and
  wherein the received response includes information about the time period.

13. The system of claim 8, wherein the extracted subject parameters and object parameters comprise a type of IoT appliance and a type of task executed by the IoT appliance, respectively.

* * * * *